United States Patent [19]
Stein

[11] Patent Number: 6,029,092
[45] Date of Patent: *Feb. 22, 2000

[54] SYSTEM AND METHOD FOR PROVIDING MODULAR CONTROL AND FOR MANAGING ENERGY CONSUMPTION

[75] Inventor: Michael Stein, Naples, Fla.

[73] Assignee: Intellinet, Inc., Naples, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/749,341

[22] Filed: Nov. 21, 1996

[51] Int. Cl.$^7$ .................................................. G05B 11/01
[52] U.S. Cl. .............................................. 700/11; 700/291
[58] Field of Search ........................ 340/825.06, 825.07, 340/825.08, 825.37, 310.01, 310.02, 310.06, 310.07, 310.08; 320/85.8, 85.9, 85.1, 85.13; 700/2, 9–17, 83–87, 80, 286, 291

[56] References Cited

U.S. PATENT DOCUMENTS

| | | | |
|---|---|---|---|
| 4,965,742 | 10/1990 | Skeirik | 364/513 |
| 5,086,385 | 2/1992 | Launey et al. | 364/188 |
| 5,400,246 | 3/1995 | Wilson et al. | 364/146 |
| 5,463,735 | 10/1995 | Pascucci et al. | 395/200.52 |
| 5,510,975 | 4/1996 | Ziegler, Jr. | 364/148 |
| 5,570,085 | 10/1996 | Bertsch | 364/146 |
| 5,572,438 | 11/1996 | Ehlers et al. | 364/492 |
| 5,598,566 | 1/1997 | Pascucci et al. | 395/750.06 |
| 5,621,662 | 4/1997 | Humphries et al. | 364/138 |
| 5,640,153 | 6/1997 | Hildebrand et al. | 340/825.06 |
| 5,642,101 | 6/1997 | Stirk et al. | 340/825.08 |
| 5,684,710 | 11/1997 | Ehlers et al. | 364/492 |
| 5,696,695 | 12/1997 | Ehlers et al. | 364/492 |

OTHER PUBLICATIONS

International Search Report dated Sep. 1, 1998.

*Primary Examiner*—Paul P. Gordon
*Attorney, Agent, or Firm*—George T. Marcou; Kilpatrick Stockton LLP

[57] ABSTRACT

A control system is extremely flexible and modular and can be equipped or upgraded to have any number or combination of features, such as security, home theater/audio, HVAC, energy management, and lighting with each feature having a separate task unit. The task units can be added or removed from a core set of units within minimal impact on the core set of units. The core set of units includes a control database unit that stores sets of commands in a relational database according to an input/output event and a command execution unit that routes the commands to the appropriate task units for execution. The core set of units do not need to understand the input/output event or the commands but rather routes the commands to the task units addressed for execution. The system has a variable database that contains a relational database of variables shared between the various task units and stores such things as all keypad displays. The individual task units query the variable database unit for values of all shared variables and automatically receive any updates in values of the shared variables from the variable database unit. The software for the system is stored in flash ROM and can be automatically upgraded through a download task unit. The system may have an energy task unit that adjusts consumption of electricity based on any changes in rate and which provides a pathway of communication with the electrical utility company.

55 Claims, 16 Drawing Sheets

SYSTEM AND METHOD FOR PROVIDING MODULAR CONTROL AND FOR MANAGING ENERGY CONSUMPTION

CROSS-REFERENCE TO RELATED APPLICATIONS

Reference is made to co-pending Patent Cooperation Treaty application entitled "USER INTERFACE FOR HOME AUTOMATION SYSTEM," having International Application No. PCT/US96/14520 and International Filing date of Sep. 18, 1996.

NOTICE OF COPYRIGHTED MATERIAL IN DISCLOSURE

A portion of the disclosure of this patent document contains material that is subject to copyright protection. The copyright owner has no objection to the facsimile reproduction by anyone of the patent document or of the patent disclosure, as it appears in the Patent and Trademark Office patent file or records, but otherwise reserves all copyright rights whatsoever.

FIELD OF THE INVENTION

In one aspect, the invention generally relates to a system and method that provides modular control over various tasks, such as security, home theatre, audio, HVAC, and lighting. In another aspect, the invention generally relates to a system and method for managing energy consumption and, more particularly, for permitting adjustments to energy consumption based on changing conditions.

BACKGROUND OF THE INVENTION

A residential security system, typically, is a stand-alone system that monitors various alarm conditions, such as the opening of a door or window or motion in a room. In response to these conditions, the security system may initiate an alarm and may auto-dial the police or a monitoring company. In many residences, the security system is equipped with several keypads with one often located near a main entrance and another located in the master bedroom. Although the exact design of keypads vary greatly, many keypads have numeric keys for the entry of special codes to disarm the system, indicators for displaying zone violations, and dedicated keys for auto-dialing the police or fire department. With this type of security system, a processing unit, which may be placed in a closet or other hidden area, is interconnected to the various motion sensors, closure contacts, the keypads, a siren, and includes the auto-dialer.

The typical residential security systems is a stand-alone device and has no interaction with other devices or systems in a residence. For instance, the typical security system is not interconnected and in no way controls a stereo system or a home theatre system. The security system also has no control over a heating, ventilating, and air conditioning (HVAC) unit and normally does have control over the lighting within the residence. These other devices or systems in the residence, instead, are stand-alone systems that provide dedicated control over the devices within their domain. For instance, an audio system may selectively control the routing of sound from a centralized audio source to numerous areas within or near the residence and may have separate keypads for each area of the residence. The home theatre system may similarly have keypads throughout the house for selectively supplying video from a central source to the various areas in the residence.

As a result of these independent systems, a residence may have a multitude of keypads distributed throughout the house. A single room, or even a single wall, may have several keypads which can be quite unsightly and detract from the overall appearance and decor of the residence. The keypads can also be quite troublesome to a resident since the keypads for the different systems in the residence are often associated with a particular operating methodology unique for each system. As a result, the resident would need to learn one procedure for operating the security system, another procedure for controlling the audio system, and yet another for the video system.

In light of a desire to have more automated control over the various devices in a residence, home automation systems have been developed which integrate the security system with one or more of the other systems, such as the lighting system. The home automation systems can provide more integrated control over all features of a house. With the home automation systems, it could be possible to perform such functions as turning on the lights in a room upon detection of motion or activating a coffee maker according to a set schedule.

A common approach to designing the home automation systems is to have a central processor communicate with each of the sub-systems and to coordinate each of the sub-systems activities. Each of the sub-systems, such as security and audio, would essentially retain their own internal design and would still have a processor which can be programmed according to the desires of the resident. To communicate with each of the sub-systems and to coordinate activities between the sub-systems, the central processor must know the commands for all of the sub-systems. With this knowledge of the commands, the central processor can command the lighting system to turn on the lights if the security system senses motion in a room or perform other coordinated functions between the sub-systems.

To address the problems with multiple keypads, home automation systems have merged two or more keypads for more than one sub-system into a single "smart" keypad. By reducing the number of keypads, the resident can more easily learn the methodology for operating the keypads and the residence would have less wall space consumed by the keypads. These smart keypads are programmed to be able to send various commands to the central processor which can then route theses commands to the individual sub-systems. To store and transmit these commands, a smart keypad has a processor and memory with the memory preferably being fairly large so that the keypad is able to store and convey a greater number of commands to the central processor.

The typical home automation system, therefore, is characterized as being a fairly powerful system with processors and associated memory in the central processor, in each of the sub-systems, and in the keypads. Because of the amount of electronics throughout the system, home automation systems have consequently been typically rather expensive. A need therefore exists for a home automation system that is not only less expensive but which does not sacrifice performance.

The typical home automation system is also rather difficult to design and develop. As discussed above, the sub-systems, the central processor, and the keypads all have processors and each of the processors are associated with some type of software program. The programs in each of the processors must be written, complied, and debugged. The initial writing of the programs is fairly difficult just considering the lines of code that must be generated for all of the processors. The task of generating the code, however, does not end with simply writing the code since the code must next be compiled, with is often laced with various syntax errors if the code does not include the proper spacing, positioning of commas, semi-colons, brackets, or other such punctuation or grammar. Once the programmer successfully compiles the code, the programmer is next faced with the onerous job of debugging the code. The programmer is inevitably challenged with having to detect problem area in the code, rewriting the code, and then repeating the steps of compiling and debugging. A significant portion of the design and development of the home automation system is therefore devoted to the process of writing, compiling, and debugging the code.

The difficulties with the code do not stop once the home automation system has been installed but continue if the resident desires another modification or upgrade. For instance, if the resident would like an additional keypad, the home automation system must be reprogrammed to know the address of the keypad. Furthermore, if the system only included security and audio and the resident wants an upgrade to include lighting, the home automation system must undergo some additional programming to accommodate the additional sub-system. This additional programming involves the writing, compiling, and debugging the code, and therefore serves as an obstacle to any modification or upgrade to the home automation system. As such, a need exists for a home automation system that can more easily and readily accommodate changes.

While an ideal home automation system includes all possible features, home automation systems practically are not all-inclusive. First of all, a home automation system which included all possible features would undoubtedly have an exorbitant cost. Consumers of home automation systems are not unanimous in the features that they desire and, as a result, home automation systems are designed to have various combinations of features. In addition to the economics, rapid changes in technology preclude such an all-inclusive system. As technology advances and becomes available, home automation systems will be encouraged to incorporate the new technology.

Other forces at work in technology and in the marketplace create new opportunities not only for home automation systems but for any residential control system. These forces include the increased competition between companies providing local phone service, long distance phone service, cellular phone, pager service, cable television, and Internet access. The lines between companies that traditionally provided only one or two of these services are fading as the laws and regulations are being rewritten to encourage the competition between companies. A residential control system, such as a home automation system, should therefore be flexible to accommodate and incorporate the changes that are imminent with the provision of telephone, cable, and Internet services.

In addition to the deregulation of the communications field, deregulation and increased competition with electrical utility companies will also likely have an impact on the provision of services in the field of electrical power. A utility company as well as all other generators of electricity generally implement a tiered approach for meeting the demand from all of its customers. At the first step, demand from all of its customers for electricity is relatively low and can be satisfied by the utility company's most energy efficient generators. As the demand becomes high and increases past the capacity of these higher efficiency generators, the utility company relies on less efficient and more expensive generators. These more expensive generators are less desirable due to their relatively low efficiency, their use of more expensive fuels, their higher levels of pollution, or the fines which are associated with their operation. At the third step, after the demand exceeds the internal capacity of a utility company, the utility company then purchases electricity from other utilities, often at a premium.

The utility companies, however, have very little control over the demand for electricity and thus limited control over their costs. Presently, an individual consumer of electricity, such as a household, has no knowledge of the demand level of the utility company unless the demand becomes an emergency issue for an entire geographical region. Thus, unless some type of warning has issued, consumers use as much electricity as they desire and at the times that they desire. A need therefore exists for a system or method by which utility companies can inform consumers of the present demand so the consumers can act to reduce the overall demand and thus act to reduce the overall cost of electricity.

Even if consumers had knowledge of the particular demand level for a utility company, however, the consumers would have no immediate incentive to alter their use of electricity to help keep the overall demand at a low level. While the aggregate effect of each individual consumer's activity could help keep costs down and thus lower the overall cost of electricity, a single consumer would have little incentive to alter his or her usage merely to increase the profits of the utility company. Further, although costs to the consumers may likely be reduced if the overall demand on a utility company is lower, many consumers may be unwilling to alter their schedules to less convenient times when other consumers, who do not alter their schedule, still receive the benefits of the reduced costs. A need thus exists for a system or method which provides incentives for consumers to reduce the overall demand on the utility company and which provides consumers with direct and prompt benefits.

In addition to the high cost associated with purchasing electricity from another utility company, the purchase of electricity from another utility company has other drawbacks. For instance, the chance and impact of a power failure increases with the number of utility companies in a power grid. As evident by events in the Pacific Northwest, an isolated and relatively minor failure can cause power outages in an area spanning several states. Thus, a need exists for a system or method for controlling overall demand on electricity, not only because a lower demand would reduce costs, but also because a lower demand would reduce the reliance on integrated power grids and should therefore increase the overall reliability of the utility companies.

Another problem facing a utility company is that it has a fairly small capacity to communicate with its consumers. Under typical circumstances, this contact is limited to a monthly bill detailing the total amount of electricity consumed and the associated cost. The utility company therefore staffs a relatively small number of personnel to handle consumer problems. During a power failure, on the other hand, a massive number of consumers call in to inquire as to the problem. At these times, the utility company is ill-equipped to handle all of the calls and consumers may be placed on hold for an extremely long period of time, such as an hour or more. This inattentiveness to the consumers' calls can significantly magnify the consumers' aggravation toward the situation and to the utility company. A need therefore exists for a system or method which improves communications between consumers and a utility company.

A need also exists for a system or method by which consumers can have an increased amount of control over their energy usage. Typically, each appliance within a house has its own dedicated control. For instance, a heating, ventilating, and air conditioning (HVAC) unit within a house has a thermostat for setting the desired temperature and a hot water heater has a control unit for controlling the temperature of the water. Additionally, the stereo, television, computer, and lamps would each have separate on/off switches. To reduce energy consumption, the consumer would therefore have to individually control each separate appliance, which can be quite burdensome. It is therefore a desire to have greater and easier control over energy consumption.

To partially fulfill the desire for greater control over energy consumption, certain appliances have been equipped with programmable units. For instance, many HVAC units have programmable control units which allows the consumer to indicate different desired temperatures for different times of the day and for different days of the week. These controls provide the consumer with the ability to match consumption more closely with the actual need. Once these control units have been programmed, however, the consumer must reprogram the unit so that the programmed schedule of usage becomes equal to the actual desired schedule of energy usage. For example, if a person comes home earlier than normal, the person must manually adjust the setting on the HVAC to the desired setting. Since a person's schedule can change often, a need exists for a system or method of controlling energy consumption which can adjust more easily and quickly to a desired or actual schedule of usage.

SUMMARY OF THE INVENTION

It is an object of the present invention to provide a control system which can be easily programmed with a desired combination of features.

It is another object of the present invention to provide a control system which can easily be changed to accommodate an additional feature or function.

It is still another object of the present invention to provide a control system which has a more streamlined design in terms of processors and programming.

It is yet another object of the present invention to provide a control system which is less expensive yet has no sacrifice in performance.

It is a further object of the present invention to provide a control system which provides keypads or other input/output units which provide a high number of keys with a minimal amount of hardware.

It is another object of the present invention to provide a system which permits a greater amount of control over the consumption of electricity.

It is yet another object of the present invention to provide a system which permits a greater amount of control over the overall cost of electricity to a customer.

It is another object of the present invention to provide a system which provides a greater amount of communication between a provider of electricity and its customers.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, in accordance with the present invention, as embodied and broadly described herein, a control system and method according to the invention have one or more task units and a set of core units. Each of the task units is for overseeing at least one device and may include a multi-room/home theatre task unit, security task unit, heating, ventilating, and air conditioning task unit, general purpose interface task unit, lighting task unit, or energy management task unit. A central processor is coupled to the devices managed by the task units and includes a control database unit for storing sets of commands in a relational database according to event and a command execution unit for routing the commands to their respective task units. A monitoring unit, which preferably comprises a multi-tasking preemptive operating system for the processor, receives input/output events from the device or task units and wakes up the individual task units associated with the events. The task units, in response, query the control database unit for the set of commands associated with the event and the control database unit identifies the set of commands to the command execution unit. The command execution unit routes the commands to the task units addressed within the commands and the task units, after receiving the commands, process the commands.

The control system and method are extremely flexible and modular whereby task units can be added or replaced with only a minimal impact on the overall system. By storing the sets of a commands in a relational database, the control database and the command execution unit need not understand the commands or the events but rather simply route the commands to their respective task units. The command execution unit need not automatically route the commands but can instead route the commands only upon the meeting of certain conditions.

With the preferred system and method, a keypad control unit monitors all keypad events. The keypads need not contain a large amount processing power since they only need to specify an address for the keypad and a key which was pressed. The control database unit, based on this identifying data, passes an appropriate set of commands to the keypad control unit and to any other affected task unit. The control system and method reduce the amount of processing that must occur at the keypads and between task units and consequently reduce the complexity and cost of the system.

The system and method may advantageously be used to monitor and control energy consumption of at electrical load. The system may have an energy management task unit that receives rate information, such as from the provider of electricity, and can adjust consumption accordingly. For instance, the load may comprise an HVAC unit and the energy management task unit may alter temperature set points of the HVAC based on the rate information. Thus, when the demand for electricity and the rate both increase, the system and method can act to reduce consumption and to lower the cost of electricity. Conversely, when the rate decreases, the system and method can take advantage of the lower rates by adjusting the set points to a more comfortable level.

The system and method preferably include a variable database unit and a download task unit. The variable database unit maintains a relational database of the values of variables which are shared between task units. The task units can query the variable database unit for values of any shared variable and also can receive automatic updates on the values of shared variables. The download task unit can respond to a download request by storing software program or data received from an external source into non-volatile memory. The download task can conveniently be used to upgrade existing software or data in memory or to modify the system or method to include new software or data.

DETAILED DESCRIPTION

Figure 1:
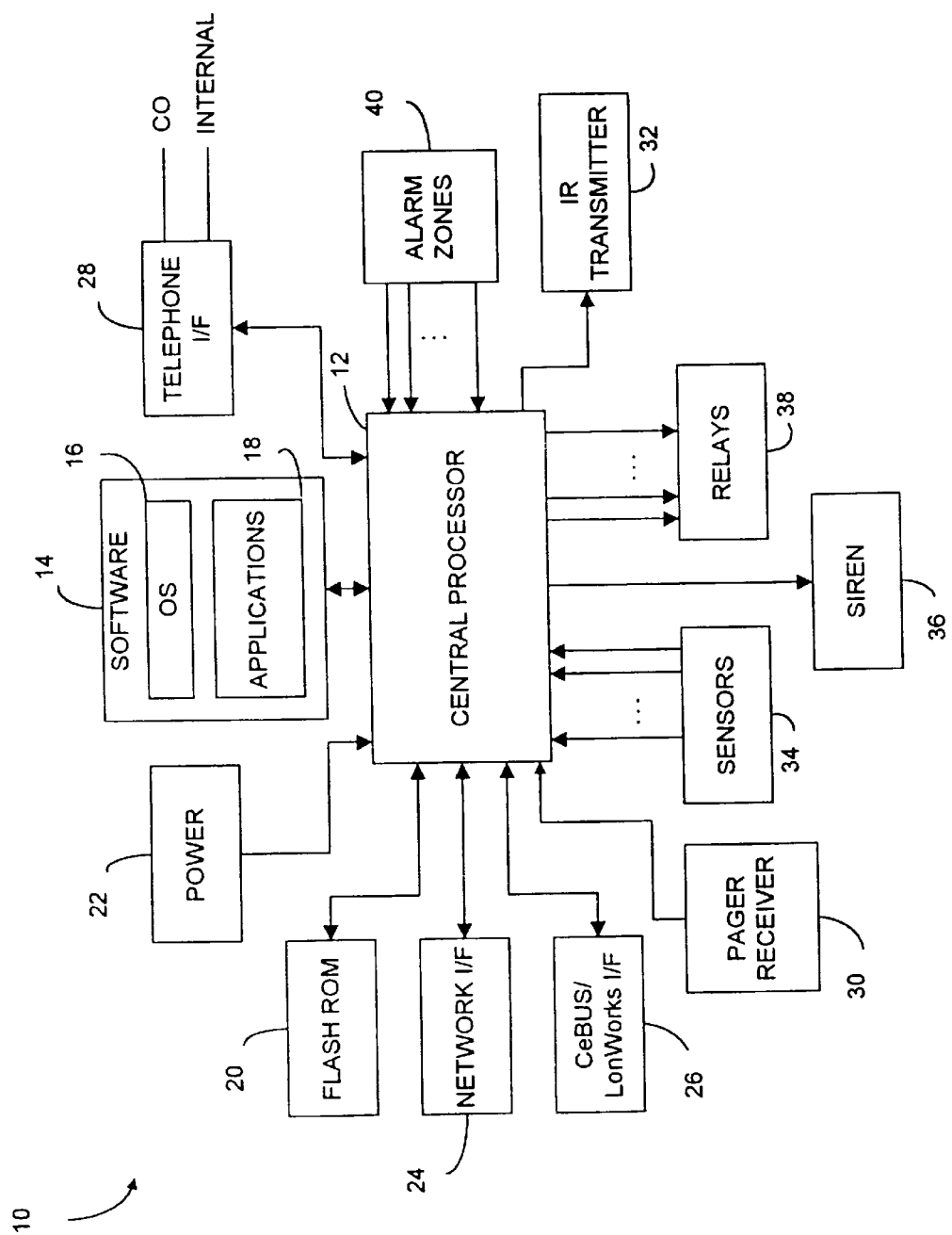
FIG. 1 is a block diagram of a control system according to a preferred embodiment of the invention.

With reference to FIG. 1, a control system 10 according to a preferred embodiment of the invention comprises a central processor 12 which is preferably a multi-tasking processor. The central processor 12 is loaded with software 14, which includes an operating system (OS) 16 and application programs 18. Preferably, the central processor 12 is the Motorola 68000 preemptive multi-tasking processor and the operating system 16 is Omega DOS, although other multi-tasking operating systems can be used. The central processor 12 is connected to non-volatile memory 20, or flash ROM 20, which preferably stores the software 14. A power supply 22 supplies power to the central processor 12 as well as to the rest of the system 10 and preferably includes a battery backup power supply.

The control system 10 includes a number of interfaces, which may include a network interface 24, a consumer electronic bus (CeBUS)/LonWorks bus interface 26, and a telephone interface 28. The network interface 24 preferably comprises a multi-drop network and, more precisely an RS 485 network and the telephone interface 28 is connected to a central office line and also to an internal telephone line. The control system 10 may also be equipped with a pager receiver 30 and an infrared transmitter 32. The control system 10 is extremely flexible in the manner in which it can communicate with external devices or systems in that it can communicate over conventional telephone lines with telephone interface 28, can receive wireless communications from pager receiver 30, can transmit infrared communications with infra-red transmitter 32, and can communicate in various standards or protocols, such as RS 485, the CeBUS standard, and the LonWorks standard. The control system 10 is not limited to these methods of communication but may incorporate other methods of communication, such as with other communication standards or protocols or with other communication transceivers or mediums, such as optical fibers.

The control system 10 has a plurality of input ports for receiving signals from devices within the system 10 and output ports for supplying signals to devices within the system 10. The input ports include those connected to sensors 34 and alarm zones 40 and the output ports include those connected to a siren 36 and to relays 38. The sensors 34, as will be described in more detail below, can be any type of sensor and may provide information related to security, energy management, lighting, or other features of the control system 10. The alarm zones 40 may represent security sensors grouped according to their type, such as door sensors, or grouped according to their proximity, such as according to the rooms in a building.

Figure 2:
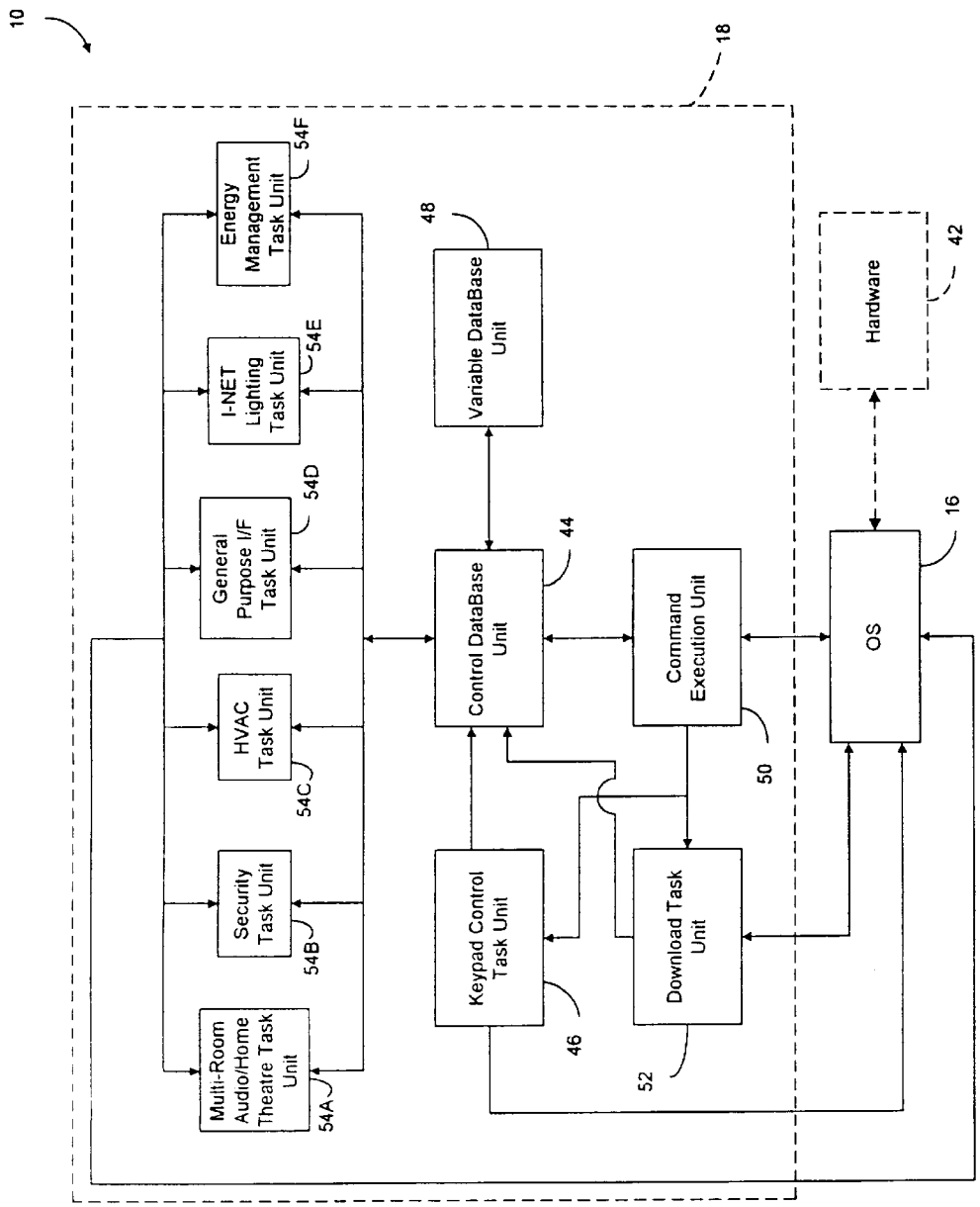
FIG. 2 is a block diagram of the control system of FIG. 1 illustrating the processor and software in further detail.

A more detailed diagram of the control system 10 showing components of the software 14 and particularly the application programs 18 is shown in FIG. 2. The operating system 16 links the application programs 18 to the other components of the control system 10, which have been generally indicated as hardware 42. The application programs 18 may include a number of task units 54, each of which includes a stand-alone program, a stack, and private memory storage. The exact number and functions of the task units 54 may vary according to a desired design of a control system 10, but may include such things as a multi-room audio/home theater task unit 54A, a security task unit 54B, a heating, ventilating, and air-conditioning task (HVAC) unit 54C, a general purpose interface task unit 54D, a lighting task unit 54E, and an energy management task unit 54F. A significant advantage of the invention is that additional task units can be easily added to the control system 10.

The application programs 18 include a number of core units which are preferably common to any control system 10 regardless of the exact selection of task units 54. The core units include a download task unit 52 and a keypad control task unit 46. The download task unit 52 is used to download data from an external source to the flash ROM 20 and is beneficial when upgrading the software 14 in the system 10 or when adding new software to the system 10. The keypad control task unit 46 is used to control keypads associated with the control system 10 and consequently controls any displays or indicators on the keypads. The core units in the system 10 further include a control database unit 44, a variable database unit 48, and a command execution unit 50. In general, the control database unit 44 stores commands which are executed by the various task units in the control system 10 and the variable database 48 maintains the most recent values of any variables shared between the task units. The command execution unit 50 receives the commands from the control database unit 44 and routes the commands to the proper task units for execution.

Figure 3:
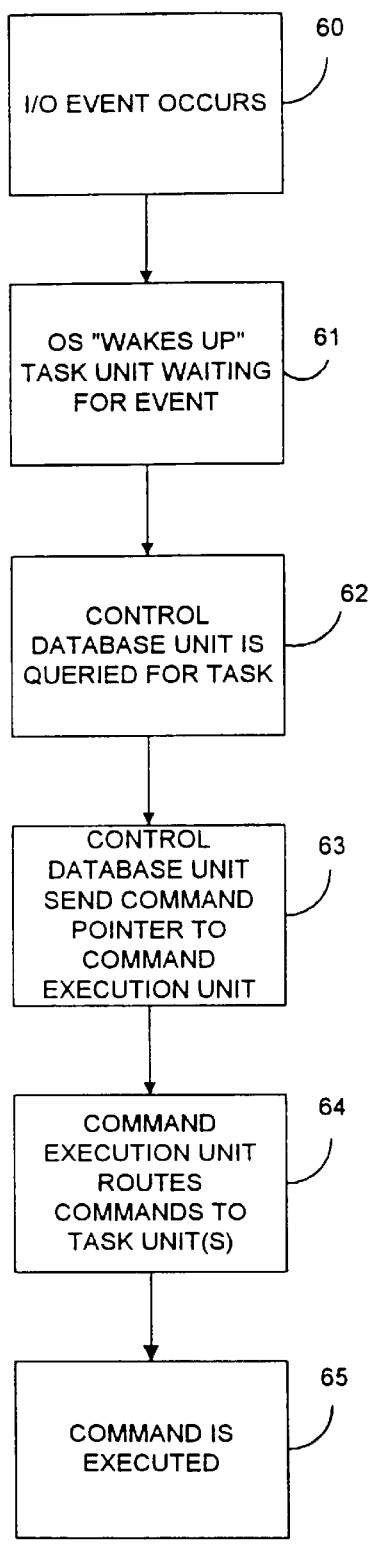
FIG. 3 is a flow chart illustrating an overall process by which the control system of FIG. 1 processes an input/output event.

An overall process by which the control system 10 operates is shown in FIG. 3. In response to an input/output event occurring at step 60, the operating system 16 wakes up the particular task unit assigned to that event at step 61 by sending that event a notice signal. The input/output event may be one of any of a plurality of events, including such things as the pressing, releasing, or holding down of a button on a keypad, an alarm state change detected in one of the zones 40, or an HVAC system state change as detected with one of the sensors 34. The input/output event may also be caused by a device or system external to the system 10, such as a communication through telephone interface 24, network interface 24, CeBUS/LonWorks interface 26, or pager receiver 30. Furthermore, the input/output event includes activity from another task unit. For instance, an operation by the HVAC task unit 54C of activating a relay 38 may be considered an input/output event that triggers a response from the keypad control task unit 46 to alter a display on one of the keypads.

At step 61, the operating system 16 wakes up the task units assigned to that input/output event, such as any of task units 46, 52, or 54. The operating system 16 detects the task responsible for an event based on an address portion of the signal which is generated with the event. The operating system 16 thus reads this portion of the signal and supplies a notice signal to the addressed task unit. At step 62, the woken-up task unit queries the control database unit 44 for commands associated with the input/output event. The control database unit 44 maintains a relational database of all input/output events and the sets of commands associated with each input/output event. At step 63, the control database unit 44 looks up the set of commands associated with the received input/output event and supplies a command pointer to the command execution unit 50. The command pointer identifies that portion of the relational database where the set of commands for the input/output event are stored. At step 64, the command execution unit 50 sends the commands to the appropriate task unit or task units. As with the operating system 16, the command execution unit 50 does not determine the type of command but rather routes each command based on an address portion stored in the relational database. After the commands are passed to their respective task units, the task units rely on the operating system 16 and other resources of the system 10 in order to execute or otherwise process the command. The operating system 16 provides all of the necessary device drivers, such as those for timers, serial communications, network communications, IR transmissions, X10 communications, dual-tone multi-frequency (DTMF) communications, and for the relays 38.

Figure 4:
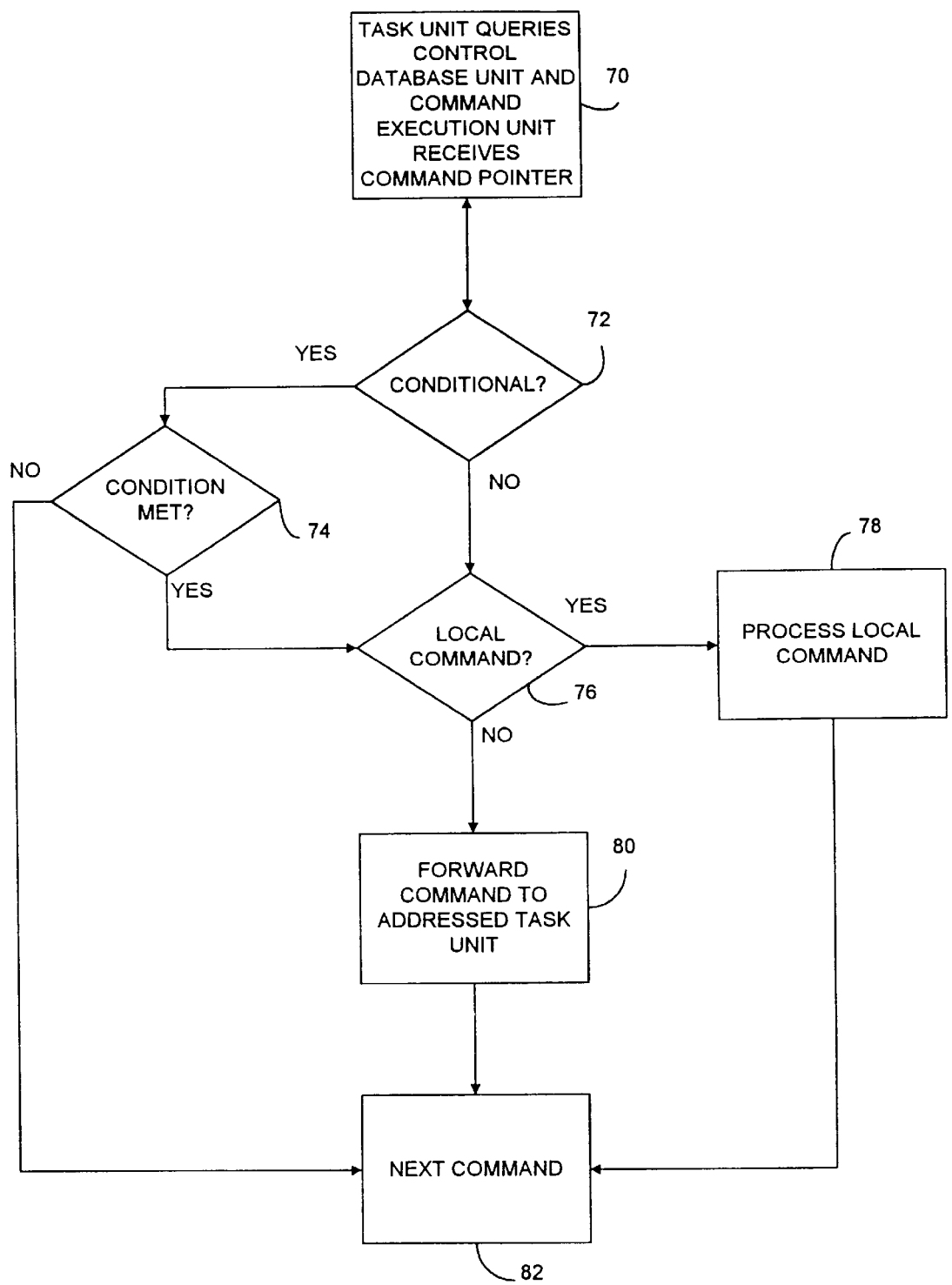
FIG. 4 is a flow chart illustrating operations of a command execution unit shown in FIG. 2.

An operation of the command execution unit 50 is shown in more detail in FIG. 4. At step 70, a task unit which has been woken-up queries the control database unit 44 for the set of commands and the control database unit 44 supplies the command execution unit 50 with a command pointer to the set of commands associated with the input/output event. At step 72, the command execution unit 50 turns to the first command in the set and determines whether the command has a condition associated with it. If the command does have a condition associated with it, the command execution unit 50 next determines at step 74 if the condition has been satisfied. The condition may be a certain value of a variable, the state of a variable, or any other type of condition which must be satisfied before the command will be executed. As an example, when a door is opened to a room as detected within one of the alarm zones 40, a command associated with this input/output event may be the turning on of a light in that room. Since the light should preferably remain off during the day, a condition may be attached to this command which will cause the command to be executed only when the door is opened during night-time hours, which may be detected with a daylight sensor within sensors 34 or simply with a time-of-day clock.

If the condition has not been met, then at step 82 the command execution unit 50 turns to the next command in the set of commands. If the condition has been met or if the command is not conditional, as determined at step 72, then the command execution unit 50 next determines whether the command is a local command at step 76. A local command is a command that may be executed by the command execution unit 50 itself and need not be supplied to a task unit. The local commands may include a DO_MACRO command for branching execution to a macro command sequence, a LINK command for linking other task units or events, a DELAY command for initiating a delay in processing, or a CANCEL DELAY which cancels a pending delay. The command execution unit 50 may be structured to have other local commands if desired. If the command is a local command, the command execution unit 50 will consequently execute the command itself.

If the command is not a local command as determined at step 76, then the command execution unit 50 will forward the command to the appropriate task unit at step 80. The control database unit 44 stores the sets of commands according to task unit. As a result, the command execution unit 50 need not make an independent assessment of the type of command but rather simply looks at that portion of the command which addresses the designated task unit for that command. Based on this portion of the command, the command execution unit 50 routes the command to the appropriate task. At step 82, the command execution unit 50 then turns to the next command.

Figure 5:
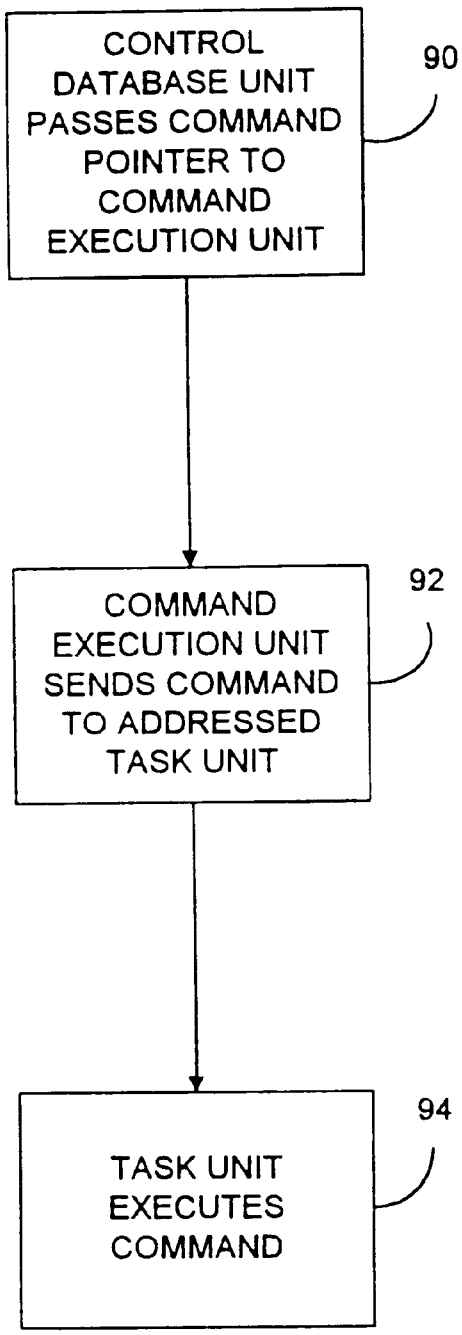
FIG. 5 is a flow chart illustrating a processing of core commands in the control system of FIG. 1.

FIG. 5 summarizes the processing of commands by the task units. At step 90, the control database unit 44 provides a command pointer to the command execution unit 50. At step 92, the command execution unit 50 sends the command to the task unit that was addressed by the command and the task unit executes the task at step 94. The command that is executed by the task unit need not result in the generation of any output signal but rather may result in some internal processing, such as updating the value of a variable. The task units may rely upon the operating system 16 in the execution of the commands.

More specifically, the control database unit 44 stores the sets of commands in the non-volatile flash memory 20. A query to the control database unit 44 includes a task identifier and an event number. The control database unit 44, in turn, supplies a resulting command pointer to a first command in the set addressed by that task identifier and event number. By storing the sets of commands in a relational database, the control database unit 44 need not determine what type of action should result from a given input/output event but can instead simply point the command execution unit to the set of commands associated with the input/output event. As shown below in Table 1, the task identifier and event number may have one set of commands for the pressing of a button number Y on a keypad number X and may have an entirely separate set of commands for the release of button number Y on keypad number X. The relational database in control database unit 44 may also have separate sets of commands for the sensing of a new temperature in the HVAC, an alarm violation, an expired timer, an open contact, or a closed contact.

TABLE 1

| TASK | EVENT |
| --- | --- |
| Keypad #X | Press #Y |
| Keypad #X | Release #Y |
| HVAC | New Temperature X |
| Alarm | Violation XX |
| Timer | Expired XX |
| GPI | Open XX |
| GPI | Close XX |

Most of the task units, such as task units 54, download task unit 52, and keypad control task unit 46, store values for their own local variables and use these values as needed. Some of these variables, however, may be needed by one or more of the other task units in the execution of their commands and therefore must be accessed by these other task units. For example, the state of a daylight sensor within sensors 34, which is stored by the General Purpose Interface task unit 54D, may need to be used by the lighting task unit 54E when determining whether to turn on a light upon the opening of a door.

Figure 6:
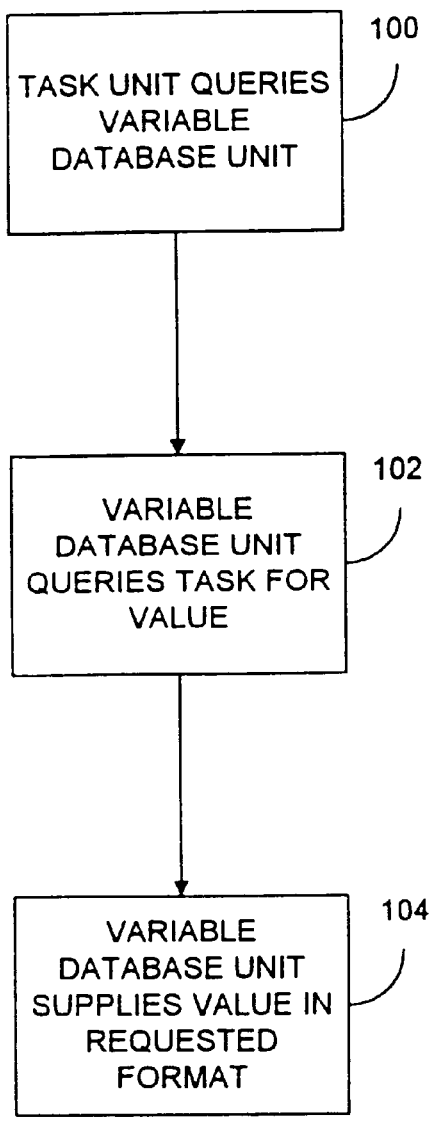
FIG. 6 is a flow chart illustrating a process of querying a variable database unit shown in FIG. 2.

The variable database unit 48 is a vehicle by which one task unit can access the value of a variable stored by another task unit. The variable database unit 48 provides a virtual database of variables and any task unit can query the variable database unit 48 for a value of any variable shared between task units. A process by which a task unit interacts with the variable database unit 48 is shown in FIG. 6. At a step 100, a task unit queries the virtual database unit 48 for the value of a shared variable. A query may include an identifier for the task that owns the variable, a number identifying the variable, and a preferred return format, which may be a string variable of variable length or an integer which is preferable a 16 bit signed number. At step 102, the variable database unit 48 queries the task unit responsible for that variable for the value of the variable and, in response, receives the value for the variable. At step 104, the variable database unit 48 returns the value of the requested variable to the task unit in the format specified by that task unit.

Figure 7:
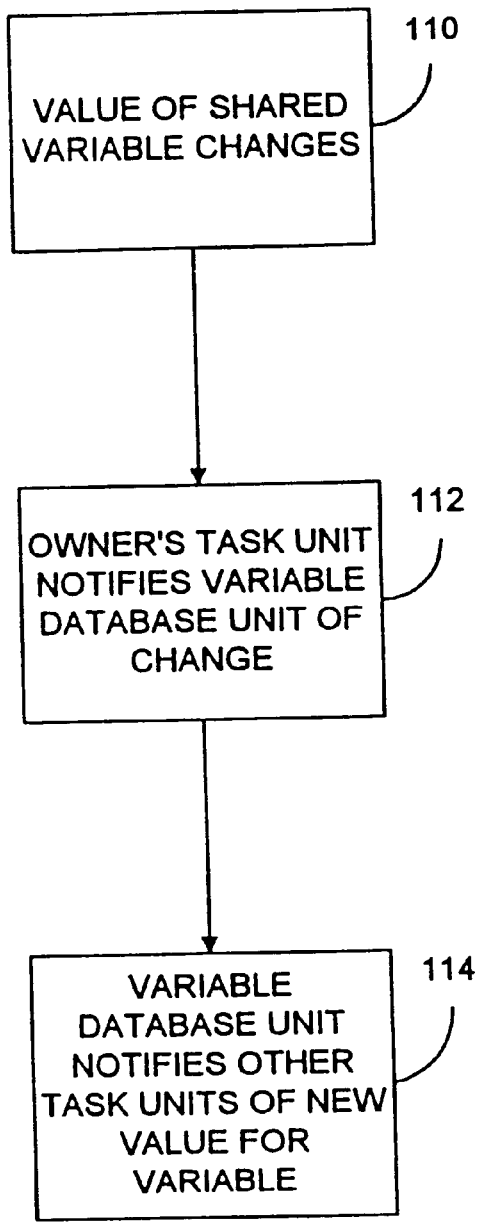
FIG. 7 is a flow chart illustrating a process of updating task units with new values of shared variables.

The variable database unit 48 also provides updates to all interested task units upon the occurrence of any change in the value of a shared variable. With reference to FIG. 7, at a step 110, when the value of a shared variable changes, the owner's task unit notifies the variable database unit 48 at step 112 of a change in the value for that shared variable. Next, at step 114 the variable database unit 48 notifies other tasks of the new value for the variable. The variable database 48 need not notify all of the task units, but rather may send an automatic update to only those interested task units requesting the automatic updates. The updating of a shared variable preferably constitutes an input/output event that triggers the control database unit 44 to initiate a set of commands for updating all interested task units. While the values of the shared variables are preferably stored by the owner's task, the variable database unit 48 may store the value of some shared variables, such as the current time, the current date, or other such system information.

As an example, a shared variable may be an ambient room temperature. The HVAC task unit 54C is the owner's task for the ambient temperature and stores this value in its own memory. When a change in the ambient room temperature occurs, as described above with reference to FIG. 3, the operating system 16 wakes up the HVAC task 54C and the HVAC 54C eventually receives the updated temperature. The HVAC task 54C, as described above with reference to FIG. 7, then notifies the variable database unit 48 of such a change and the variable database unit 48, in turn, also notifies all interested tasks of the new value for the ambient air temperature. These commands for notifying the other task units are stored as a set in the control database unit 44. One of these interested tasks may be keypad control task unit 46 which displays the current temperature on one of the keypads.

By using relational databases in both the control database unit 44 and the variable database unit 48, the programming of the control system 10 is greatly simplified. The software 14 is not characterized by numerous lines of codes but rather is based on the data stored in the relational databases. As a result, the actual code for the software 14 is fairly small and can be easily debugged. Rather than writing, compiling, and debugging code, a process of generating the software 14 may occur by simply changing the data in the relational databases or by placing new data in the databases. To verify the operation based on the changes in the relational databases, the programmer can then operate the system 10 based on the new changes. For instance, to verify the response of the control system 10 to the opening of a door, the programmer can "open" the door in software and follow the actions of the control system 10 to ensure the proper operation of the control system 10. Significantly, the software 14 can be easily modified by simply changing the data stored in the relational databases.

The control system 10 is not limited to any particular arrangement of hardware but rather can be custom designed for a particular application. The control system 10 may be designed to have a wide variety of functionality, including security, home automation, energy management, lighting control, or control over audio/video sources. Due to the flexibility in the design of the control system 10, the control system 10 can be used within a diverse range of commercial or residential buildings, such as houses, apartments, townhouses, condominiums, factories, hospitals, hotels, restaurants, or offices, or within other environments.

Figure 8:
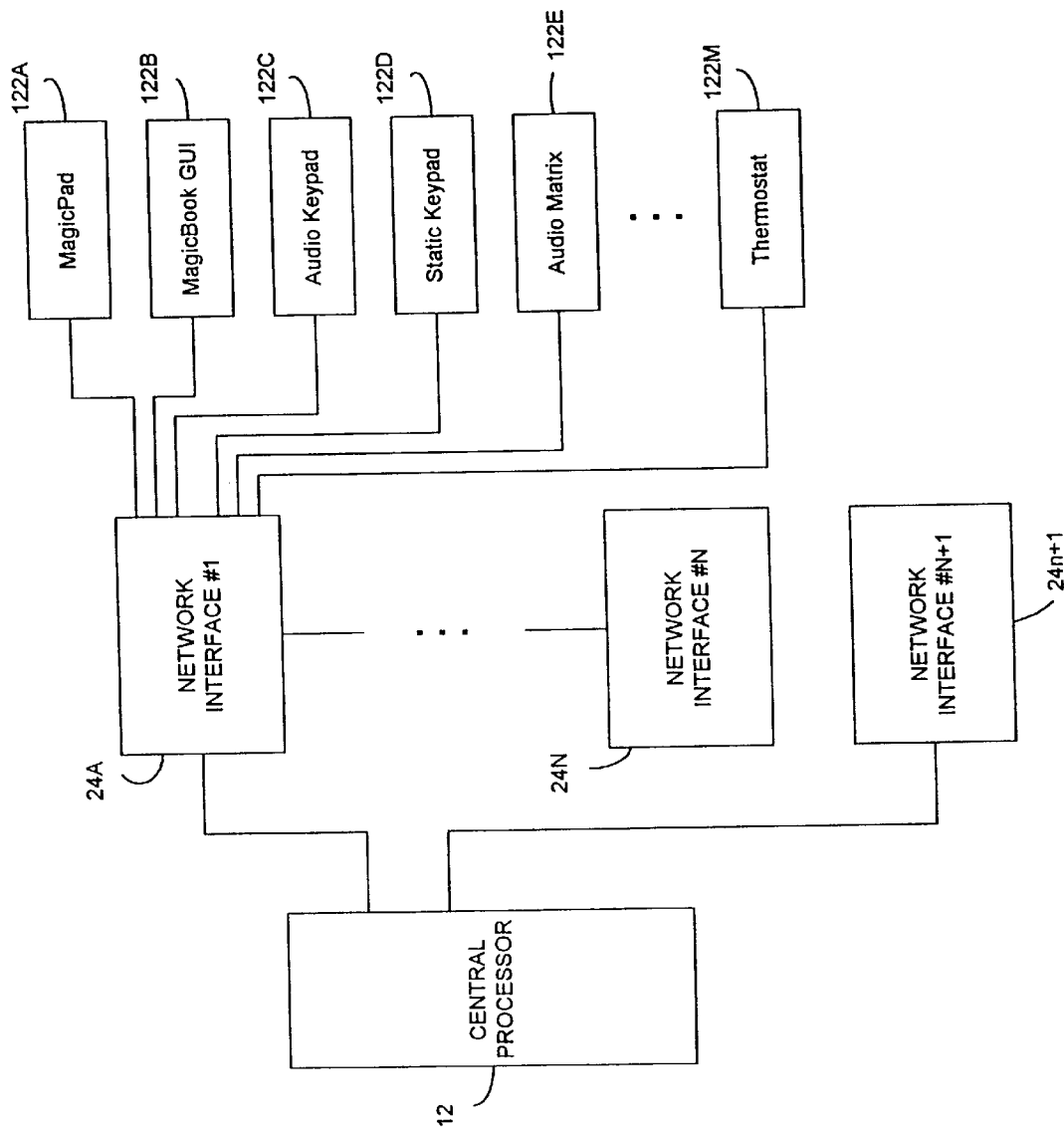
FIG. 8 is a partial block diagram of the system of FIG. 1 interconnected with an exemplary set of sensors.

An example of a network that the control system 10 may form a part of is shown in FIG. 8. The central processor 12 may be connected through a first network interface 24A to a plurality of network devices 122. These devices may include a MagicPad user interface 122A, a MagicBook graphical user interface 122B, an audio keypad 122C, a static keypad 122D, an audio matrix 122E, or a thermostat 122M. The MagicPad interface 122A, the MagicBook graphical user interface 122B, the audio keypad 122C, and the static keypad 122D are preferable selected from the line of Magic user interfaces available from the assignee of the present invention, although other keypads and graphical user interfaces may be used. Further information on a suitable interface may be obtained with reference to co-pending PCT application entitled "User Interface for Home Automation System," having International Application Serial No. PCT/US96/14520 and International filing date Sep. 18, 1996, which is hereby incorporated by reference. The audio matrix 122E is also available from the assignee of the present invention and provides source selection, volume control, bass control, and treble control for six different zones. The audio matrix 122E also provides six contact sensors for monitoring the power status of attached sources and an output relay for controlling a non-sensing amplifier. The network interfaces 24 need not be connected to just keypads but may be connected to other network devices, such as a thermostat 122M.

Moreover, the control system 10 can be connected to more than one network interface 24 in order to expand the number of devices 122 that may be connected to the system 10. As shown in the example in FIG. 8, the network interface 24A may be connected to plurality of other network interfaces 24 to form a multi-drop network with each of these other network interfaces 24 having one or more network devices 122 connected to them. While the network is preferably an RS 485 network, the network may comprise another type of communication standard, such as RS 232. Further, the network may comprise an RS 485 network and may have an RS 232 adapter as one of the network devices 122. The network interface 24A may also be used to connect to another control system 10 to further expand the capabilities of the system 10. Additionally, a lighting controller, such as the LC-16 lighting controller, is preferably connected to the CeBUS/LonWorks interface 26.

The central processor 12 preferably includes a second network port for connecting to a network interface 24N+1 with this other network interface 24N+1 having the same capabilities as network interface 24A. This other network interface 24N+1 may advantageously be used for a thermostat or may be used to emulate an Ademco security interface. The Ademco interface would allow the control system 10 to use any Ademco security panel for a large or complex security system and would allow the control system 10 to use Ademco peripherals, such as relays, zone expanders or keypads.

Figure 9:
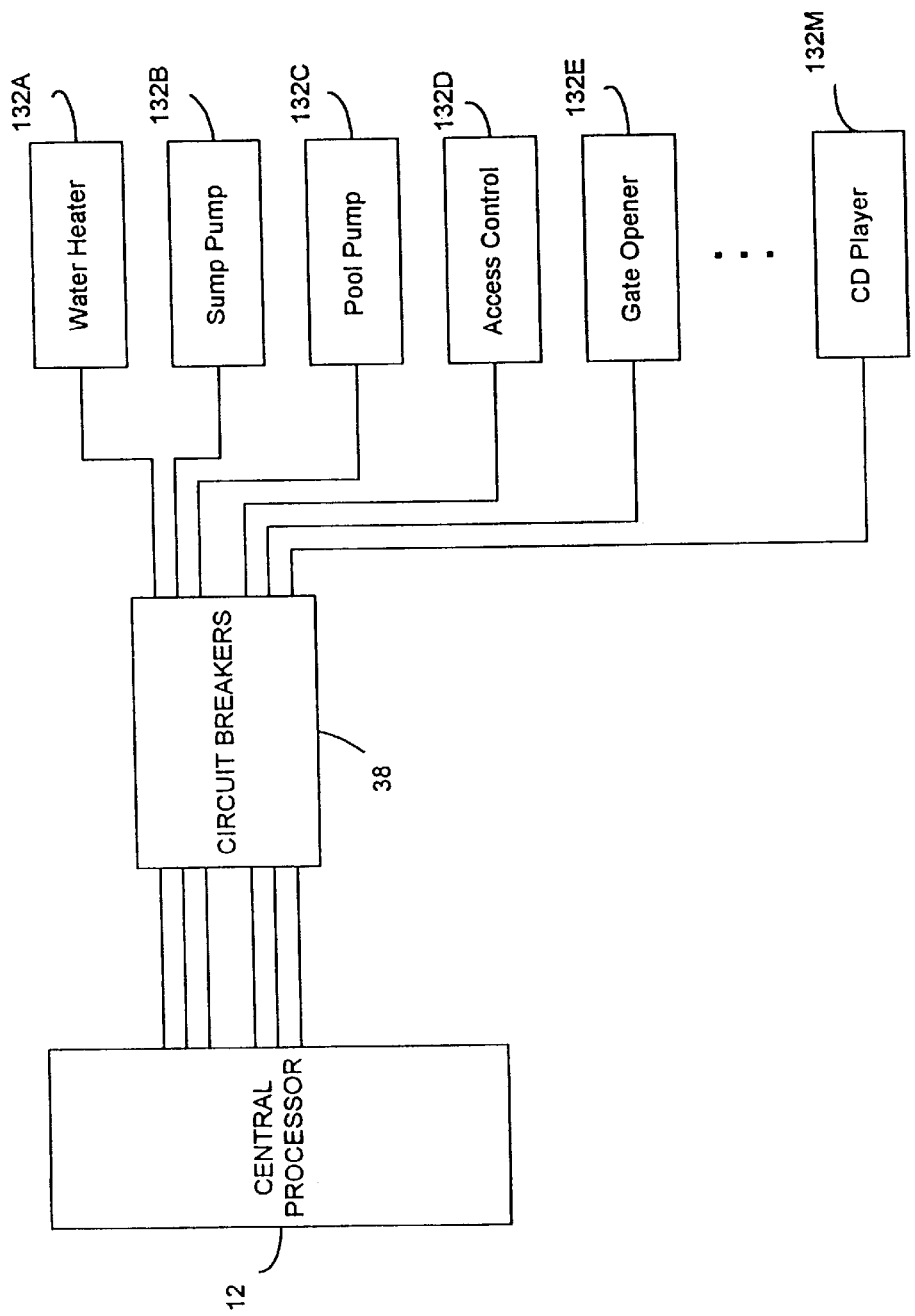
FIG. 9 is a partial block diagram of the system of FIG. 1 interconnected to an exemplary set of relays and devices.

The relays 38 in FIG. 1 are just an example of a device that may be connected to the output ports of the processor 12. By controlling a set of relays 38, the control system 10 can conveniently control power to other devices and thus turn devices on or off and provide other types of control over devices. An example of a set of relays 38 that may be connected to the central processor 12 and their related devices 132 is shown in FIG. 9. The relays 38 may comprise circuit breakers, such as low voltage controlled circuit breakers, for controlling a plurality of devices 132, including a water heater 132A, a sump pump 132B, a pool pump 132C, an access control device 132D, a gate opener 132E, or a CD player 132M. While the audio matrix 122E preferably controls a CD player in a main stereo system, the circuit breakers 38 may be used as an alternate means of controlling power to the stereo or may be used to control auxiliary audio or video components. The operating system 16 can selectively control any one of the relays 38 in accordance with the programming of any one of the task units 54. The control system 10 may have any number of relays, but preferably includes at least twelve low voltage relays. The devices 132 shown in FIG. 9 are only examples of what may be controlled by the system 10 and other loads, status lights, motors, bells, whistles, or other devices may be controlled by the system 10 through the relays 38.

Figure 10:
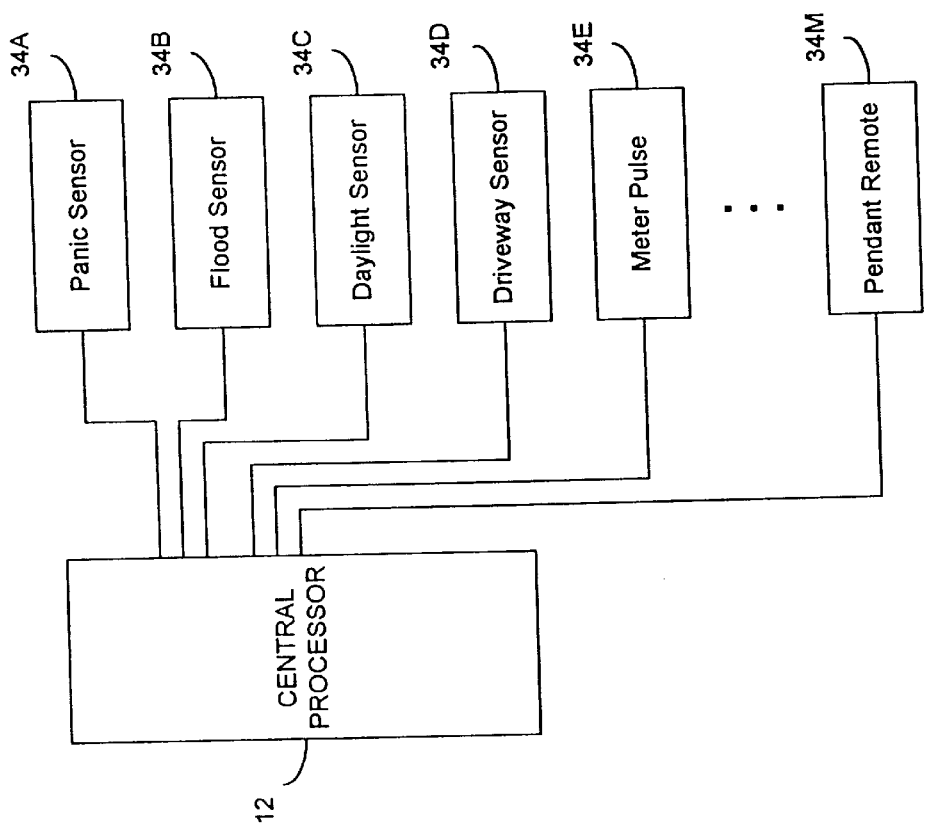
FIG. 10 is a partial block diagram of the system of FIG. 1 interconnected to an exemplary set of sensors.

Furthermore, the type and number of sensors 34 connected to the central processor 12 may be optimally set according to the desires of a particular application of the control system 10. As an example, as shown in FIG. 10, the central processor 12 may be connected to a panic sensor 34A, a flood sensor 34B, a daylight sensor 34C, a driveway sensor 34D, a meter pulse from an electrical meter 34E, or a pendent remote sensor 34M. The central processor 12 may be connected to any number of sensors, but preferably has the capability to receive up to twelve sensor inputs. Each of these sensors 34 is therefore considered part of the hardware 42 which may trigger an input event as shown in step 60 in FIG. 3.

Figure 11:
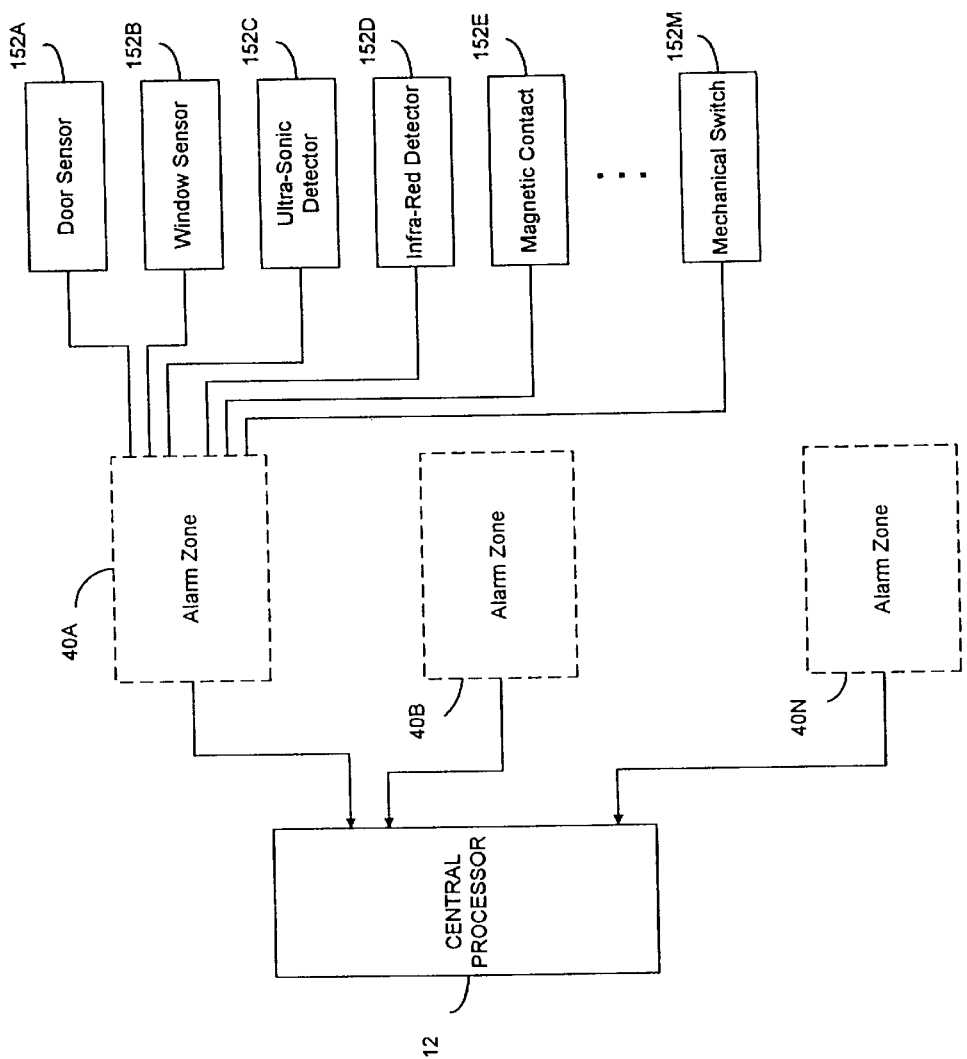
FIG. 11 is a partial block diagram of the system of FIG. 1 interconnected to an exemplary of security devices.

Although the exact design of alarm zones will vary with the security needs of an application, an example of an arrangement of alarm zones 40 is shown in FIG. 11. The control system 10 may form a plurality of alarm zones from zone 40A to zone 40N, but preferably includes at least six alarm zones 40. Each alarm zone, such as alarm zone 40A, is connected to a plurality of alarm sensors 152. The sensors 152 may include a door sensor 152A, a window sensor 152B, an ultra sonic detector 152C, an infrared detector 152D, a magnetic contact 152E, or any type of mechanical switch 152M. As is known in the art, the sensors may be grouped together to form zones that correspond to certain areas within a building or may be grouped according to their functionality. As described above, a network interface 24 may be used as an Ademco interface to further expand the security capabilities of the system 10.

In general, commands can be classified as either a core command related to a core unit or a user command related to one of the optional user task units. The core units are always present on a control system 10 and include the core units of the keypad control task unit 48, the control database unit 44, the variable database unit 48, the command execution unit 50, and the download unit 52. The user task units 54, in contrast, can include any one or any combination of the task units 54 or even other task units not illustrated in FIG. 2. The control system 10 has a modular design that allows task units to be added as desired. The core units of the system 10 need not be rewritten to accommodate these additional task units and need not know or understand the functions that the task units perform. Rather, the relational databases in the control database unit 44 and in the variable database unit 48 may need to be changed to include additional sets of commands or to include additional shared variables.

Figure 12:
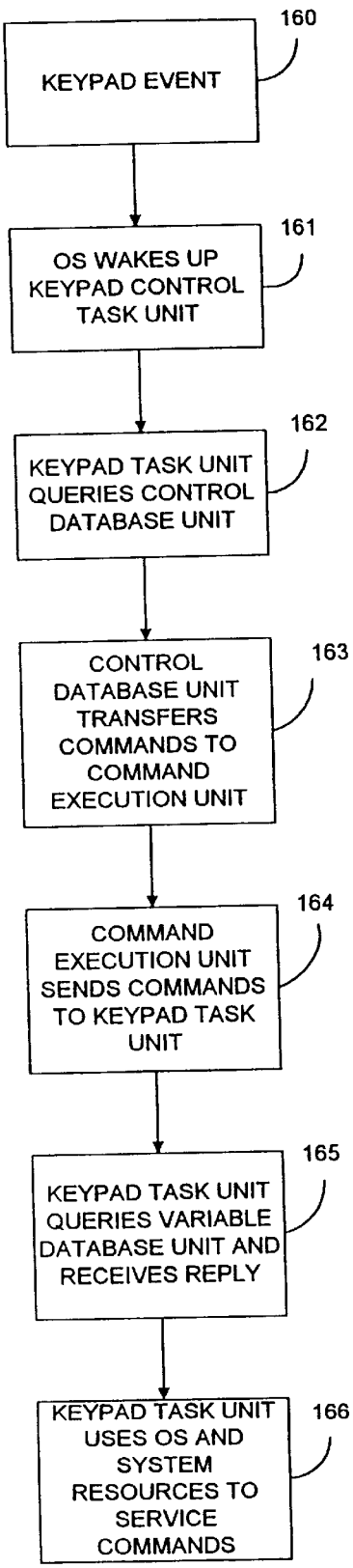
FIG. 12 is a flow chart illustrating a processing of a keypad event.

A brief description of the keypad control task unit 46 will now be provided with reference to FIG. 12. In response to a keypad event at 160, such as the pressing, releasing, or holding down of a keypad button, the operating system 16 wakes up the keypad control task unit 46 at step 161. At step 162, the keypad control task unit 46 queries the control database unit 44 for the appropriate commands. The query includes a task identifier identifying the keypad control task unit 46 and also an identifier for the event. The event identifies the address of the keypad that was activated, the particular key on that keypad, and whether the key was pressed, released, or held. While each keypad has a finite number of keys, each keypad can have an infinite number of virtual keys in software by using pages or menus of keys. At step 163, the control database unit 44 looks up the set of commands associated with that task and event and transfers the commands to the execution unit 50. Next, at step 164 the command execution unit 50 sends the commands to the appropriate task units, such as to the keypad task 46. The keypad control task unit 46 queries the variable database 48, if necessary, to obtain values of shared variables at step 165 and then uses the operating system 16 and system resources in hardware 42 to service the commands assigned to the keypad task unit 46. The commands may vary according to the particular keypad and hardware, but may include such commands as updating a display or LED on a keypad, scrolling text displayed on the keypad, or returning a value of an addressed variable.

Figure 13:
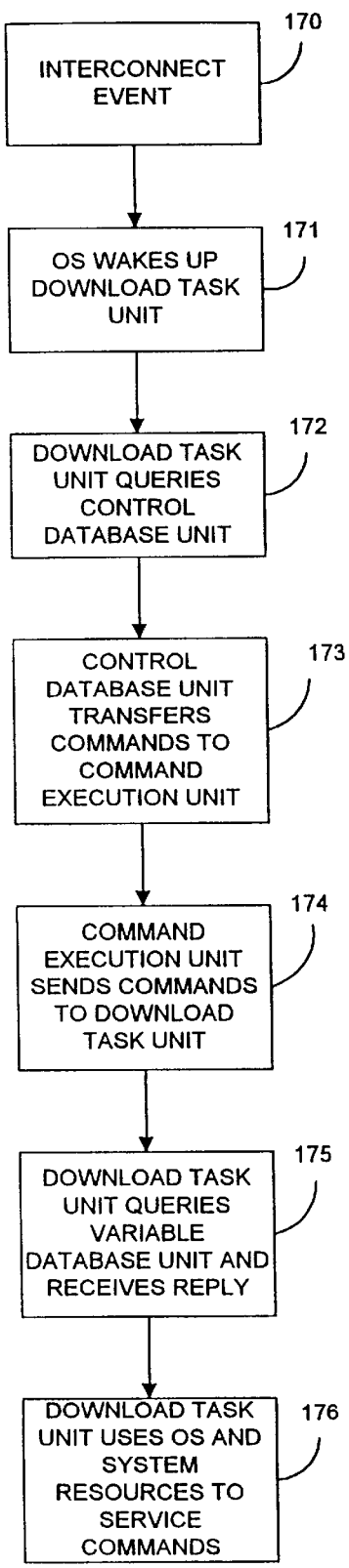
FIG. 13 is a flow chart illustrating a download process executed by the control system of FIG. 1.

The download task 52 can advantageously be used to download upgrades or other changes or additions to the software 14 in flash ROM 20. With reference to FIG. 13, in response to an interconnect event at step 170, the operating system 16 wakes up the download task unit 52 at step 171. The interconnect event may be a message or command received while the control system 10 is communicating with an external source, such as through the telephone interface 28, the network interface 24, the CeBUS/LonWorks interface 26, or the pager receiver 30. The download task unit 52, at step 172, then queries the control database unit 44 for the set of commands associated with the interconnect event. At step 173, the control database unit 44 passes a pointer to the set of commands to the command execution unit 50 which then routes the set of commands to the appropriate task units, such as to the download task unit 52 at step 174. At step 175, the download task unit 52 queries the variable database unit 48 for values of any shared variables and then, at step 176, uses the operating system 16 and the system resources to transfer data to the flash ROM 20. With the download task 52, the control system 10 can download new versions of software used with any of the task units 54, can add additional task units, or can even upgrade the operating system 16.

Figure 14:
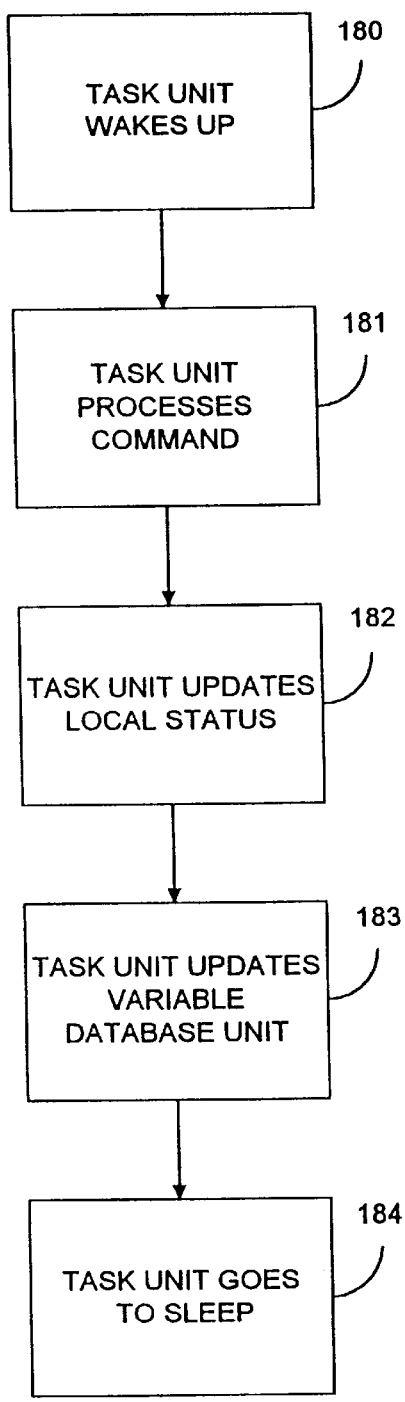
FIG. 14 is a flow chart illustrating a general process of activity within a task unit within the control system of FIG. 1.

While the precise commands executed by each of the task units 54 will vary according to the desired features in the control system 10, the task units 54 generally have an operating methodology shown in FIG. 14. At step 180, the task unit is woken-up by the operating system 16 and is later supplied with the commands from the command execution unit 50. At step 181, the task unit processes and executes the commands, using the operating system 16 or other resources as needed, then updates the status of any local parameters at step 182. With a change in any local variable, the task unit also updates the variable database 48 at step 183 prior to going to sleep at step 184. The task then remains in a sleep state until the next input/output event that causes the operating system 16 to wake the task unit.

The task unit 54 can be programmed according to the particular desires of an application and the invention is therefore not limited to any particular design of the task units 54. Nonetheless, a brief description of a select number of the task units 54 will be provided in order to provide a more clear understanding of how the task units may interact with the overall control system 10 and with devices external to the system 10. With reference first to the multi-room audio/home theater task unit 54A, the multi-room audio task unit 54 responds to the commands of Sel_Source which specifies a particular source for a zone, Set_Volume which sets the volume for a particular zone, Set_Bass which sets the volume level of the bass for a particular zone, Set_Treble which sets the treble volume for a particular zone, and Update_Var which returns the updated value of a variable to the variable database unit 48. The multi-room audio task unit 54A also maintains shared variables of the current source for each zone, the current volume for each zone, the current bass for each zone, and the current treble for each zone.

The general purpose interface task unit 54D is used to control the relays 38 and to process contact closure inputs from the sensors 34. The general purpose interface task unit 54D responds to the commands of Activate_Relay to activate a relay of a particular address to a certain state, Pulse_Relay to pulse a relay at a particular address from a first state to a second state for a certain duration, and Update_Var to return the updated value of a variable to the variable database unit 48. The general purpose interface task unit 54D also maintains the shared variables of the input status of each attached sensor 34. Frequently, the general purpose interface task unit 54D will simply be monitoring a device's status and will not be directly executing commands in response to a change in status.

As should be apparent, the control system 10 can be programmed so that a change in a variable stored in one task unit can also influence the operation of other task units. The control system 10 allows this easy interaction between task units by having each task unit update the variable database unit 48 with the new value of the variable upon each change. For instance, with reference to FIG. 15, a security event can cause a reaction in both the security task 54B and also the HVAC task 54C. At step 191, a security event is detected with the hardware 42 thereby causing the operating system 16 to wake up the security task 54B at step 192. The security event can be any one of any number of events, such as a change in the state of the driveway sensor 142D or the operation of the MagicPad 122A, MagicBook 122B or static keypad 122D to arm or disarm the security system. The security task unit 54B queries the control database unit 44 for the set of commands associated with the event at step 193 and the control database unit 44 provides the command execution unit 50 with a pointer to the set of commands at step 194. The command execution unit 50 routes the commands to the appropriate task units at step 195.

Figure 15:
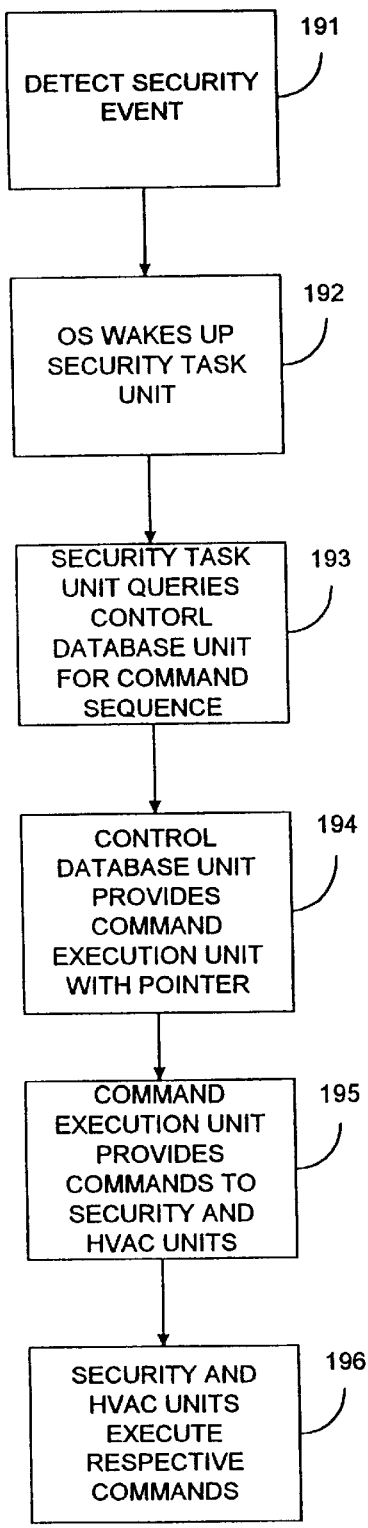
FIG. 15 is a flow chart illustrating an exemplary process by the control system of FIG. 1 in which security functions are interrelated to HVAC events.

In the exemplary programming shown in FIG. 15, the command execution unit 50 provides commands to both the security task unit 54B and the HVAC task unit 54C. At step 196, the security task unit 54B and the HVAC task unit 54C execute their respective commands. The HVAC task unit 54C may be structured so that the set points for the ambient air temperature are lowered for the heating unit and raised for the air conditioning unit when the security system is armed, on the assumption that the occupant has left the premises. In addition to the HVAC task unit 54C, the general purpose interface task unit 54D may also receive commands from the command execution unit 50 in response to the arming of the security system so as to turn off the water heater 152A through one of the relays 38. Furthermore, the lighting task unit 54E may also receive a command from the command execution unit 50 to turn off the lights throughout the entire house or within certain zones within the house. The multi-room audio/home theater task unit 54A may also receive a command from the command execution unit 50 to turn off all audio and video devices upon the arming of the security system. Since the HVAC unit, hot water heater, lighting, and audio video in the house may only need to be affected if the security system is armed during the day and not during the night, a condition may be placed on the commands sent to the task units other than the security task unit 54B, which would be evaluated by the execution unit 50 at step 72 in FIG. 4. Thus, the task units may receive the commands only if the event occurred during the day light or during day-time hours.

The control system 10 therefore allows one to force the actual consumption of electricity closer to the minimal needs of the occupant of the house. Thus, the hot water heater 152A, the lighting, and all the audio and video devices within the house may be turned off when the occupant is not within the premises. In all, the control system 10 enables an occupant to have more control over the consumption of electricity and provides a system 10 whereby the overall consumption of electricity can be lowered with minimal impact on the occupants.

Figure 16:
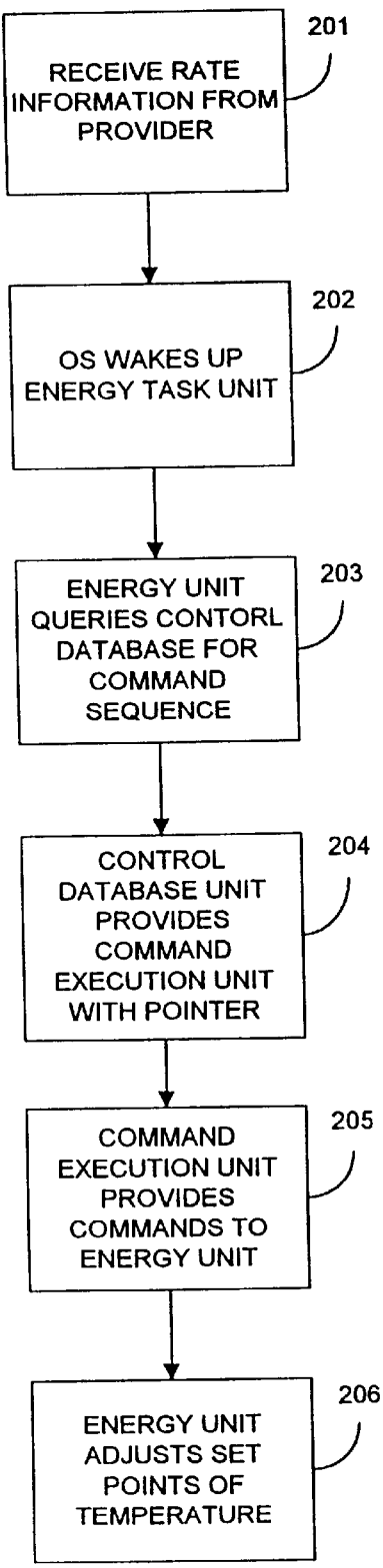
FIG. 16 is a flow chart illustrating an exemplary process by the control system of FIG. 1 in which energy consumption can be adjusted based on rate information from a utility company.

The control system 10 may also include the energy management task unit 54F for managing the energy consumption in a building. The energy management task unit 54F permits an occupant to respond in real-time to fluctuations in pricing of electricity. With reference to FIG. 16, the control system 10 can be interconnected with the utility company or other provider of electricity and receive rate information at step 201. The control system 10 can hook up to the utility company in any one of a plurality of ways to receive this information. For instance, the control system 10 may initiate a dial-up access through the telephone interface 28 and communicate with the utility company over the telephone lines, such as with an analog modem, a digital modem over ISDN lines, or with an ADSL transceiver. The control system 10 may also receive the rate information in real-time through pager receiver 30, through CeBUS/ LonWorks interface 26 or through network interface 24. Once the control system 10 receives this updated rate information, the operating system 16 wakes up the energy task unit 54F at step 202 and the energy task unit 54F queries the control database unit 44 for the set of commands associated with that event. At step 204, the control database 44 provides the command execution unit 50 with a pointer to the set of commands and the command execution unit 50 at step 205 provides the commands to the energy task unit 54F as well as to any other affected task units 54.

At step 206, the energy task unit 54F and the other affected task units 54 execute their commands. The energy task unit 54F, at this step, can provide appropriate adjustments to the set points of the ambient air temperature and provide these updated values to the variable database unit 48. The variable database unit 48, in turn, provides updates to all other task units 54 that share the set points with the energy task unit 54F. The energy task unit 54F, for instance, may place the set points for the room temperature at different levels depending upon whether the pricing is in a low range, medium range, or high range. The updating of the set points may be an input/output event that has a set of commands associated with it. The HVAC task unit 54C may be one of the task units that receives a command issued in response to the update so as to adjust the operation of the HVAC unit accordingly. Other tasks, such as the multi-room audio/home theater task unit 54A, the general purpose interface task unit 54D, and the lighting task unit 54E may also be affected by changes in the pricing of electricity.

In addition to responding to changes in the rate of electricity, the energy management task unit 54F may also be used to provide a greater degree of communication with the utility company. For instance, the utility company may download a monthly bill to the control system 10. In response to this event, the energy task unit 54F can respond by comparing the amount in the bill with an amount computed by the energy task unit 54F based on the rate information from the utility company throughout the billing period and the amount of consumption as measured by the meter pulse 142E. Any discrepancies discovered by the energy task unit 54F can be displayed by the keypad control task unit 54 46 on a keypad along with the monthly bill. The occupant can review the bill and can initiate an inquiry to the utility company by depressing a designated key on the keypad. Then, in response to this keypad event, the energy task unit 54F may receive a command to transmit a message to the utility company, such as over one of the interfaces 24, 26, or 28. Additionally, if the monthly bill is acceptable, the occupant may approve payment of the bill with another designated key on the keypad which results in the transmission of a different message to the utility company. The energy management task unit 54F may also be used in Automated Meter Reading (AMR) for transferring a total amount of usage, as determined from meter pulse 34E, to the utility company. As should be apparent, the energy management task unit 54F permits a great degree of control over the consumption of electricity and an advanced amount of bi-directional communication capability with the utility company.

While the control database unit 44 has been described as storing a set of command for each input/output event, it should be understood that some events may not require any action on the part of any task unit or core unit. Further, the task unit that is woken up in response to an event may not receive any of the commands stored for that event. In other words, the sub-set of commands that the woken-up task unit receives from the command execution unit 50 includes the null set.

It should be recognized that the system and methods disclosed are merely illustrative of the principles of the present invention. Numerous modifications and adaptations thereof will be readily apparent to those skilled in the art without departing from the spirit and scope of the present invention. Accordingly, the invention is only limited by the following claims.

I claim:

1. A control system, comprising:
   a command execution unit;
   a control database unit for storing a plurality of commands associated with a plurality of input signals in a relational database;
   at least a first task unit for overseeing a first device and a second task unit for overseeing a second device;
   a monitoring unit for supplying a first notice signal to said first task unit after receipt of a first input signal and for supplying a second notice signal to said second task unit after receipt of a second input signal;
   said first task unit, in response to said first notice signal, supplying a first query signal to said control database unit requesting commands associated with said first input signal and second task unit, in response to said second notice signal, supplying a second query signal to said control database unit requesting commands associated with said second input signal;
   said control database unit, in response to said first query signal, identifying a first set of commands associated with said first input signal to said command execution unit and, in response to said second query signal, identifying a second set of commands associated with said second input signal to said command execution unit;
   said command execution unit for routing a first sub-set of commands to said first task unit and for routing a second sub-set of commands to said second task unit;
   wherein said first task unit processes said first sub-set of commands and said second task unit processes said second sub-set of commands.

2. The control system as set forth in claim 1, wherein said first task unit comprises a security task unit for monitoring a plurality of security sensors.

3. The control system as set forth in claim 1, wherein said first task unit comprises a lighting task unit for controlling power to a plurality of lights.

4. The control system as set forth in claim 1, wherein said first task unit comprises a heating, ventilating, and air conditioning task unit for controlling operation of a heating, ventilating, and air conditioning unit.

5. The control system as set forth in claim 1, wherein said first task unit comprises an audio task unit for controlling operation of an audio system.

6. The control system as set forth in claim 1, wherein said first task unit comprises a video task unit for controlling operation of a video system.

7. The control system as set forth in claim 1, wherein said first task unit comprises a general purpose interface task unit for controlling a plurality of relays.

8. The control system as set forth in claim 1, wherein said first task unit comprises a keypad control task unit and said first device comprises a keypad.

9. The control system as set forth in claim 1, wherein said first set of commands associated with said first input signal includes at least one command in said first sub-set of commands.

10. The control system as set forth in claim 1, wherein said first set of commands associated with said first input signal includes at least one command in said second sub-set of commands.

11. The control system as set forth in claim 1, wherein said control system comprises a central processor and said monitoring unit comprises an operating system for said central processor.

12. The control system as set forth in claim 11, wherein said processor comprises a multi-tasking processor and said operating system comprises a multi-tasking operating system.

13. The control system as set forth in claim 1, further comprising a variable database for storing a value of a shared variable, said first task unit and said second task unit both retrieving the value of said shared variable when processing said first and second sub-sets of commands, respectively.

14. The control system as set forth in claim 13, wherein said first and second task units update the value of said shared variable after processing said first and second sub-sets of commands, respectively.

15. The control system as set forth in claim 1, wherein said first task unit comprises a download task unit for receiving data from an external source and for upgrading said second task unit with said data.

16. The control system as set forth in claim 1, wherein said first task unit comprises a download task unit for receiving data from an external source and for upgrading said monitoring unit with said data.

17. The control system as set forth in claim 1, further comprising an interface for connecting said control system to a telephone line and a transceiver for communicating with an external device over said telephone line.

18. The control system as set forth in claim 1, further comprising an interface for connecting said control system to a network and a transceiver for communicating with an external device over said network.

19. The control system as set forth in claim 18, wherein said network comprises an RS 485 network.

20. The control system as set forth in claim 18, wherein said network comprises a CeBUS network.

21. The control system as set forth in claim 18, wherein said network comprises a LonWorks network.

22. The control system as set forth in claim 1, further comprising a pager receiver for receiving data over a paging network.

23. The control system as set forth in claim 1, further comprising an infrared transmitter for communicating with an infrared receiver, said first task unit transferring messages to said infrared transmitter for transmission to said infrared receiver.

24. A control system having a plurality of units, comprising:
  said plurality of task units each for overseeing at least one device;
  a central processor coupled to said devices, said central processor comprising:
    a control database unit for storing sets of commands, said control database unit comprising a relational database associating said sets of commands with input signals;
    a command execution unit;
    a monitoring unit for receiving said input signals from the devices and for generating notice signals to the one individual task units associated with said input signals;
    said task units supplying query signals to said control database unit;
    said control database unit providing said sets of commands associated with said input signals to said command execution unit;
    said command execution unit reading address data associated with each command of said sets of commands and routing the commands to the one task units specified by said address data;
  wherein said plurality of task units executes said commands received from said command execution unit; and
  a variable database for use in maintaining values of shared variables, said shared variables being retrieved by more than one of said task units and being updated by the more than one of said task units.

25. The control system as set forth in claim 24, wherein said processor comprises a multi-tasking processor.

26. The control system as set forth in claim 24, further comprising non-volatile memory and a download task unit for replacing data in said non-volatile memory with data received from an external source.

27. The control system as set forth in claim 26, wherein said data stored in said non-volatile memory is program data and said data received from said external source is an upgrade to said program data.

28. A keypad control system, comprising:
  at least one keypad for generating a keypad signal upon an occurrence of a keypad entry;
  a command execution unit;
  a control database unit for storing commands in a relational database according to keypad signals;
  a keypad task unit for overseeing said keypad;
  a second task unit for overseeing a device;
  a monitoring unit for supplying a notice signal to said keypad task unit after receipt of said keypad signal from said keypad;
  said keypad task unit, in response to said notice signal, supplying a query signal to said control database unit requesting a set of commands associated with said keypad entry;
  said control database unit, in response to said query signal, notifying said command execution unit of the set of commands associated with said keypad entry;
  said command execution unit for routing at least one command in the set to said second task unit;
  wherein said second task unit controls said second device in response to the one command and, consequently, in response to the keypad entry.

29. The keypad control system as set forth in claim 28, wherein said keypad signal identifies said keypad from a plurality of keypads and identifies a button on said keypad out of a plurality of buttons on said keypad.

30. The keypad control system as set forth in claim 28, wherein said keypad comprises a plurality of buttons and a respective plurality of display portions near said plurality of buttons, said keypad providing descriptions in the display portions of their respective buttons.

31. The keypad control system as set forth in claim 30, further comprising a variable database for storing the descriptions for the buttons.

32. A control method, comprising the steps of:

storing sets of commands in a relational database according to at least one input/output event;

receiving a first input/output event and retrieving a set of commands associated with said first input/output event;

routing each command in said set of commands to a task unit assigned to each command;

processing each command at the task unit assigned to each command; and querying a variable database unit for a value of a variable, the variable database unit comprising a relational database.

33. The method as set forth in claim 32, wherein said step of storing said sets of commands in said relational database comprises a step of indexing said set of commands according to a task unit identifier and event identifier.

34. The method as set forth in claim 32, wherein said step of receiving an input/output event comprises a step of detecting said input/output event with a monitoring unit and notifying the task unit assigned to the input/output event.

35. The method as set forth in claim 34, wherein said step of detecting said input/output event comprises a step of detecting said input/output event with a multi-tasking operating system for a processor.

36. The method as set forth in claim 32, wherein said step of retrieving the set of commands comprises the steps of passing a pointer to a command execution unit and reading a first command in said set of commands with said command execution unit.

37. The method as set forth in claim 32, wherein said step of routing each command comprises a step of reading an address portion of each command and passing each command in the set to the task unit identified in said address portion.

38. The method as set forth in claim 32, wherein said step of routing each command comprises a step of evaluating any condition associated with each command and passing each command to its task unit only if said condition is satisfied.

39. The method as set forth in claim 32, wherein said step of routing each command comprises the steps of determining whether each command is a local command and processing each local command with a core unit.

40. The method as set forth in claim 32, further comprising a step of updating the variable database unit with a value of the variable, wherein the variable is shared between task units.

41. The method as set forth in claim 32, wherein said step of receiving said input/output event comprises a step of receiving an input signal from a device.

42. The method as set forth in claim 32, wherein said step of receiving said input/output event comprises a step of detecting an output signal generated by one of the task units.

43. The method as set forth in claim 32, wherein said step of receiving said input/output event comprises a step of detecting an activity by one of the other task units.

44. The method as set forth in claim 32, wherein said step of receiving said input/output event comprises a step of detecting a new software program and said step of processing each command comprises the step of storing the new software program in non-volatile memory.

45. The method as set forth in claim 32, wherein said step of receiving said input/output event comprises a step of detecting a rate change in electricity and said step of processing each command includes a step of altering a provision of electrical power to an electrical load.

46. A method of interfacing with a first building control apparatus using a control database, a variable database and an executing unit comprising:

detecting an event;

searching the control database for one or more commands associated with the event and the first building control apparatus;

retrieving at least one variable from the variable database if the one or more commands require the at least one variable;

returning a pointer that references the one or more commands; and executing the one or more commands via the executing unit by using the pointer to access the one or more commands.

47. The method of claim 46, wherein the executing of the one or more commands results in one or more output signals being transmitted to the first building control apparatus so as to control the first building control apparatus.

48. The method of claim 46, wherein the executing of the one or more commands results in updating data within the variable database.

49. The method of claim 46, further comprising:

checking a condition associated with one or more commands before executing the one or more commands.

50. The method of claim 46, wherein a subset of the one or more commands are associated with the event and a second building control apparatus.

51. The method of claim 46, wherein the executing unit is a command execution unit.

52. The method of claim 46, wherein the executing unit is a task unit.

53. A system for controlling a plurality of different device types in a building, comprising:

a command execution unit;

a control database that stores a plurality of commands associates with both a command execution unit and a plurality of task units;

a variable database that stores variables associated with a sub-plurality of commands;

wherein a search of the control database is executed in response to an event and a pointer to a set of commands stored in the control database is returned to the command execution unit; and wherein at least one variable is retrieved from the variable database if the set of commands includes any commands from the sub-plurality of commands.

54. The system of claim 53, wherein the command execution unit and the plurality of task units are software components.

55. The system of claim 53, wherein the control database is updateable via additional commands without affecting the command execution unit.

* * * * *